US008309247B2

(12) United States Patent
Shinyashiki et al.

(10) Patent No.: US 8,309,247 B2
(45) Date of Patent: Nov. 13, 2012

(54) METHOD FOR COMPRESSING INDIVIDUAL CELLS IN BATTERY MODULE

(75) Inventors: Yoshitaka Shinyashiki, Moriguchi (JP); Masayuki Fujiwara, Moriguchi (JP); Hitoshi Maeda, Moriguchi (JP); Atsuhiro Funahashi, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 12/923,843

(22) Filed: Oct. 8, 2010

(65) Prior Publication Data

US 2011/0023290 A1 Feb. 3, 2011

Related U.S. Application Data

(62) Division of application No. 12/155,093, filed on May 29, 2008, now abandoned.

(30) Foreign Application Priority Data

Jun. 1, 2007 (JP) ................................. 2007-147116

(51) Int. Cl.
*H01M 4/82* (2006.01)
*H01M 6/00* (2006.01)
*H01M 6/46* (2006.01)

(52) U.S. Cl. ...................................... 429/152; 29/623.1
(58) Field of Classification Search ................ 29/623.1; 429/152
See application file for complete search history.

(56) References Cited

U.S. PATENT DOCUMENTS

| | | | | |
|---|---|---|---|---|
| 4,828,939 A * | 5/1989 | Turley et al. | ................... | 429/405 |
| 2002/0138971 A1 | 10/2002 | Onishi et al. | ................. | 29/623.1 |
| 2005/0202311 A1 | 9/2005 | Higashino et al. | ............... | 429/99 |
| 2007/0122695 A1 | 5/2007 | Kim et al. | ..................... | 429/152 |
| 2009/0208828 A1* | 8/2009 | Kanai et al. | ................... | 429/120 |

FOREIGN PATENT DOCUMENTS

| | | |
|---|---|---|
| JP | 2003-323874 A | 11/2003 |
| JP | 2006-40696 A | 2/2006 |
| JP | 2006-196222 A | 7/2006 |
| WO | WO 2006135008 A1 * | 12/2006 |

OTHER PUBLICATIONS

Battery. Dictionary.com. Dictionary.com Unabridged. Random House, Inc. http://dictionary.reference.com/browse/battery (accessed: Jun. 28, 2010).
Cell. Dictionary.com. Dictionary.com Unabridged. Random House, Inc. http://dictionary.reference.com/browse/cell (accessed: Jun. 28, 2010).

* cited by examiner

*Primary Examiner* — Basia Ridley
*Assistant Examiner* — Sean P Cullen
(74) *Attorney, Agent, or Firm* — Kubovcik & Kubovcik

(57) ABSTRACT

A battery module has a plurality of prismatic batteries (2) stacked in a thickness direction. Two plates (3, 4) are provided between each of the batteries (2), and each of the batteries (2) is compressed by shifting the two plates (3, 4) in directions away from each other. A pair of frame members (10, 20) having opposing surfaces (11, 21) extending along the stacking direction of the batteries (2) are disposed face to face so as to sandwich the batteries (2) in a direction perpendicular to the stacking direction of the batteries. Wedge-shaped spacers (12, 22) inserted between the two plates (3, 4) are provided respectively on the opposing surfaces. By narrowing the gap between the pair of frame members (10, 20), the spacers (12, 22) are allowed to advance inwardly between the two plates (3, 4) so that the two plates are shifted in directions away from each other, whereby the batteries are compressed.

6 Claims, 3 Drawing Sheets

PRIOR ART

METHOD FOR COMPRESSING INDIVIDUAL CELLS IN BATTERY MODULE

This application is a division of application Ser. No. 12/155,093, filed May 29, 2008 now abandoned, which claims priority based on Japanese Patent Application No. 2007-147116, filed Jun. 1, 2007, and which are incorporated herein by reference.

BACKGROUND OF THE INVENTION

1. Field of the Invention

The present invention relates to a battery module in which a plurality of prismatic batteries are retained in a compressed state.

2. Description of Related Art

A battery module has a laminate type casing member and incorporates a plurality of prismatic lithium-ion batteries accommodated in the casing member, each having a plurality of electrode plates laminated with separators sandwiched between them. This type of battery module has a large capacity and shows good performance at high rate current. For this reason, the battery has been used for robots, electric vehicles, and backup power sources, for example.

In the laminate type prismatic lithium-ion batteries such as described above, expansion and shrinkage of the electrode plates occur during charge and discharge. When the distance between the electrode plates increases, electron conductivity lowers in the positive electrode active material layer and the negative electrode active material layer, and as a consequence, the internal resistance increases, causing battery capacity loss and cycle performance deterioration. In view of this, in the battery module in which the prismatic lithium-ion batteries are stacked, it is desirable that each of the batteries is compressed so that the distance between the electrode plates cannot increase.

In Japanese Published Unexamined Patent Application Nos. 2003-323874, 2005-259500, and 2006-196222, the laminate type prismatic lithium-ion batteries as described above are stacked in a thickness direction with plates or spacers interposed therebetween. Constraining plates are provided at both ends of the stacked batteries, and the constraining plates are clamped with a belt or connecting rods so that each of the batteries is compressed.

A problem with such methods of compressing the batteries is that it is difficult to apply a uniform pressure to each of the batteries. In particular, when the number of the stacked batteries is large, the problem arises that the pressure applied tends to vary between the batteries positioned at both ends and those positioned in the vicinity of the center. Thus, the internal resistance rises in some of the batteries, and consequently, battery capacity loss and cycle performance deterioration tend to occur easily.

During high rate discharge, each of the batteries generates heat, but in the conventional battery module structures, the heat cannot be dissipated sufficiently. In some cases, the battery temperature rises to the upper limit of the operating temperature range, causing the battery to fail to discharge.

In Japanese Published Unexamined Patent Application No. 2006-40696, a plurality of flat-shaped batteries is stacked in a thickness direction, and a set of heat sinks are provided at both ends along the stacking direction. By bringing a set of fastening plates provided at side faces close to each other, the heat sinks are shifted so that they are brought close to each other, whereby the batteries are compressed.

This type of battery module also has the problem that it is difficult to apply a uniformly pressure to each of the batteries because the batteries are pressed by the heat sinks disposed at both ends. Moreover, heat dissipation from each of the batteries is not sufficient, so the problem of the battery temperature elevation also remains unresolved.

BRIEF SUMMARY OF THE INVENTION

It is an object of the present invention to provide a battery module of prismatic batteries in which each of the batteries can be compressed uniformly and moreover heat can be dissipated efficiently from each of the batteries.

In order to accomplished the foregoing and other object, the present invention provides a battery module comprising a plurality of prismatic batteries stacked in a thickness direction, wherein two plates are provided between each of the batteries, and each of the batteries is compressed by shifting the two plates in directions away from each other.

In the present invention, two plates are disposed between each of the stacked batteries, and each of the batteries is compressed by shifting the two plates in directions away from each other. As a result, each of the batteries can be compressed substantially uniformly, and the effect of preventing the distance between the electrodes from increasing can be obtained to substantially the same degree among the batteries. Thus, battery capacity loss and cycle performance deterioration can be minimized.

Moreover, since the two plates disposed between each of the batteries are shifted in directions away from each other, a space is formed between the two plates. According to the present invention, heat generated in the battery can be released from this space. As a result, the heat generated from each of the batteries during high rate discharge can be released outside efficiently, and high rate charge-discharge becomes possible.

DETAILED DESCRIPTION OF THE INVENTION

Figure 1:
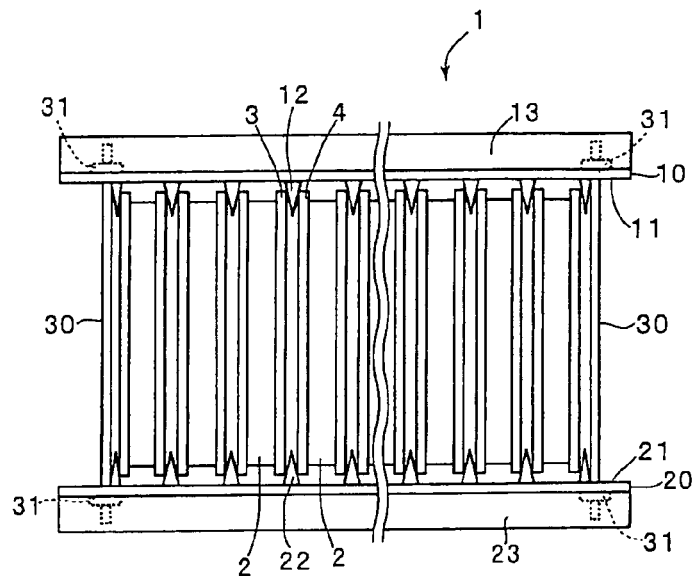
FIG. 1 is a side view of a battery module of Example 1 according to the present invention.

The battery module according to the present invention comprises a plurality of prismatic batteries stacked in a thickness direction. Two plates are provided between each of the batteries. Each of the batteries is compressed by shifting the two plates in directions away from each other.

In the present invention, two plates are provided between each of the batteries, and each of the batteries is compressed by shifting the two plates in directions away from each other. Therefore, each of the batteries can be compressed under substantially the same conditions, and each of the batteries can be compressed uniformly. Moreover, since the two plates disposed between each of the batteries are shifted in directions away from each other, a space can be formed between the two plates. As a result, heat can be dissipated from the space, so it becomes possible to dissipate heat from each of the batteries efficiently.

In a preferred embodiment according to the present invention, a pair of frame members having opposing surfaces extending along a stacking direction of the batteries are disposed face to face so as to sandwich the batteries in a direction perpendicular to the stacking direction of the batteries; wedge-shaped spacers, each being inserted between the two plates, are provided on the opposing surfaces respectively; and by narrowing a gap between the pair of frame members, the spacers are allowed to advance inwardly between the two plates, whereby the two plates are shifted in directions away from each other so that each of the batteries is compressed.

The wedge-shaped spacers are not particularly limited as long as they have a shape that allows an edge of each of the spacers to advance inwardly between the two plates so that the two plates can be shifted in directions away from each other. An example of the wedge-shaped spacer includes a triangular prismatic-shaped spacer.

By making the battery module according to the present invention using the above-described pair of frame members, it becomes possible to compress each of the batteries and also to hold each of the batteries by sandwiching them therebetween. Specifically, by shifting the two plates in directions away from each other, each of the batteries can be compressed, and, also each of the batteries can be sandwiched and held between adjacent ones of the plates.

In a preferred embodiment according to the present invention, each of the spacers is allowed to advance inwardly between the two plates by narrowing the gap between the pair of frame members. An example of the method for narrowing the gap between the pair of frame members is as follows. A plurality of connecting rods may be provided between the pair of frame members, and the gap between the pair of frame members is narrowed by tightening a threaded fastener provided on at least one end of each connecting rod.

According to the present invention, two plates are provided between each of the batteries, and the two plates are shifted in directions away from each other, as described above. Therefore, a space is formed between the two plates, so that utilizing this space, heat can be dissipated outside. For this reason, it is preferable that the plates be formed of a material that has a high thermal conductivity. For example, it is preferable that the plates be formed of a metal, such as stainless steel, aluminum, and copper. In addition, the spacers are inserted between the two plates, and heat can be released also through the spacers. Therefore, it is preferable that the spacers also be formed of a material that has a high thermal conductivity. For example, it is preferable that the spacers be formed of the same metal as that of the plates. Nevertheless, the materials for the plates and spacers in the present invention are not limited to metal, and the plates and spacers may be formed of a resin or the like.

Moreover, the spacers may either be formed integrally with the frame members or be formed separately and attached to the frame members.

It is preferable that the plates in the present invention have a flat surface portion that is substantially the same area or wider than the side surface of the prismatic battery that is to be compressed. When the plates have such a flat surface portion, the side surfaces of the batteries can be compressed uniformly.

It is preferable that the prismatic battery in the present invention be a battery in which a plurality of layers of the positive electrode and the negative electrode are laminated alternately with separators sandwiched therebetween. In such a laminate type battery, the positive electrode tabs connected to the positive electrodes and the negative electrode tabs connected to the negative electrodes are bundled respectively and taken out, and the positive electrode tabs are connected to a positive electrode terminal while the negative electrode tabs are connected to a negative electrode terminal.

It is preferable that the prismatic battery in the present invention be a battery in which an electrode assembly comprising a positive electrode, a negative electrode, and a separator, which are laminated on top of each other, is inserted in a battery case made of a flexible film such as a laminate film and an electrolyte solution is filled in the battery case.

Alternatively, the prismatic battery in the present invention may be a battery prepared in the following manner. A positive electrode and a negative electrode are overlapped and wound in a spiral state with a separator interposed therebetween to form a wound electrode assembly. The electrode assembly is pressed into a flat shape and inserted into a battery case made of a laminate film or the like.

The shape of the prismatic battery in the present invention is not particularly limited as long as it has opposing side surfaces that are to be compressed by the plates.

It is expected that the effect of the present invention can become most significant when a lithium-ion battery employing a battery case made of a laminate film is used as the prismatic battery in the present invention. The effect of preventing the distance between the electrodes from increasing by compressing the battery can be obtained most noticeably since the lithium-ion battery employing a battery case made of a laminate film tends to expand by charge-discharge particularly easily. For this reason, it is expected that the effect of the present invention can become most significant in the lithium-ion battery employing a battery case made of a laminate film. The present invention is, however, not limited as such, and it is possible to use other battery cases, such as those made of a metal can or a resin case, and other battery systems, such as nickel-cadmium storage batteries and nickel-metal hydride batteries.

EXAMPLES

Hereinbelow, the present invention is described in further detail based on examples thereof. It should be construed, however, that the present invention is not limited to the following examples.

Preparation of Multi-layered Laminate Type Prismatic battery

Preparation of Positive Electrode 90 weight % of $LiCoO_2$ as a positive electrode active material, 5 weight % of carbon black as a conductive agent, and 5 weight % of polyvinylidene fluoride as a binder agent were mixed with N-methyl-2-pyrrolidone (NMP) as a solvent to prepare a positive electrode mixture slurry. Thereafter, the resultant positive electrode mixture slurry was applied onto both sides of an aluminum foil serving as a positive electrode current collector. Then, the material was dried to remove the solvent and compressed with rollers to a thickness of 0.1 mm, and thereafter, it was cut into a sheet having dimensions of 95 mm in width and 95 mm in height. Thus, a positive electrode was prepared.

It should be noted that $LiNiO_2$, $LiMn_2O_4$, and composite materials thereof may be used as a positive electrode active material other than the $LiCoO_2$ mentioned above.

Preparation of Negative Electrode 95 weight % of graphite powder as a negative electrode active material and 5 weight % of polyvinylidene fluoride as a binder agent were mixed with a NMP solution as a solvent to prepare a negative electrode mixture slurry. Thereafter, the resultant slurry was applied onto both sides of a copper foil serving as a negative electrode current collector. Then, the material was dried to remove the solvent and compressed with rollers to a thickness of 0.08 mm, and thereafter, it was cut into a sheet having dimensions of 100 mm in width and 100 mm in height. Thus, a negative electrode was prepared.

Although artificial graphite was used as the negative electrode active material, natural graphite and other carbon materials may also be used suitably.

Attaching Current Collector Tabs

A positive electrode tab made of an aluminum foil and a negative electrode tab made of a copper foil were attached to the positive electrode and the negative electrode, respectively, by ultrasonic welding.

Preparation of Stacked Electrode Assembly 50 sheets of the above-described positive electrode with the positive electrode tab and 51 sheets of the above-described negative electrode with the negative electrode tab were laminated with polypropylene separators (100 mm×100 mm, thickness 30 μm) so that the positive electrode tabs and the negative electrode tabs were located on the same side. It should be noted that the positive and negative electrodes were laminated so that the negative electrodes were located at the outermost portions. An insulating tape was wound around the resultant laminate, and a stacked electrode assembly was thus completed.

Preparation of Electrolyte Solution

Ethylene carbonate (EC) and methyl ethyl carbonate (MEC) were mixed at a volume ratio of 30:70, and $LiPF_6$ was dissolved into the resultant mixed solvent at a concentration of 1 M (mole/liter). Thus, an electrolyte solution was prepared.

Preparation of Multi-layered Laminate Type Battery

The above-described stacked electrode assembly was inserted into a battery case made of a laminate film. A side of the battery case on which the positive electrode tabs and the negative electrode tabs were attached was thermally bonded, and further, two sides of the remaining three sides were also thermally bonded. Next, the above-described electrolyte solution was filled into the battery case from the one side that was not yet thermally bonded. After filling the electrolyte solution, the one side that was not yet bonded was thermally bonded to thereby hermetically seal the battery case. Thus, a stack electrode battery was completed.

Figure 4:
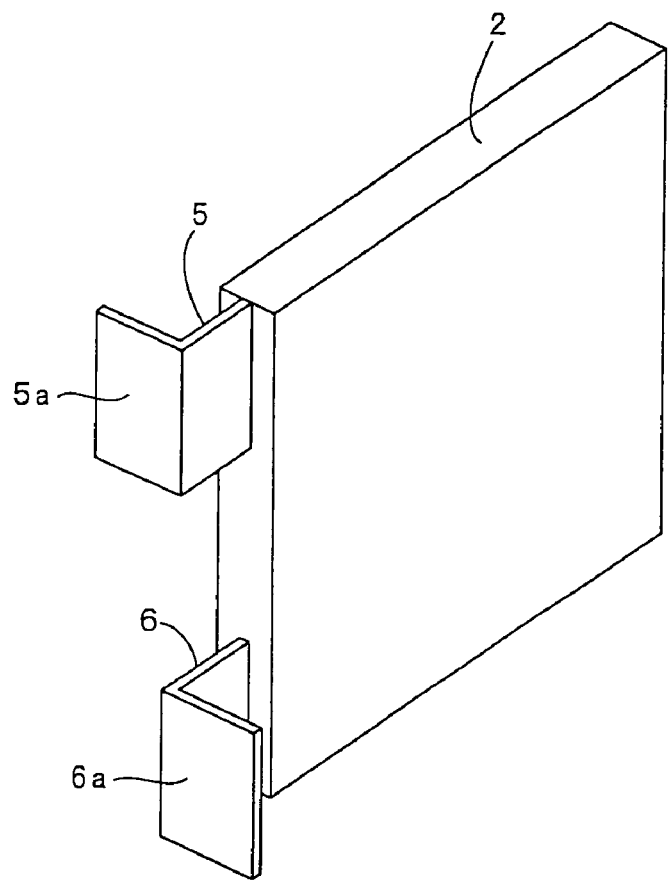
FIG. 4 is a perspective view illustrating a stack electrode battery of Example 1 according to the present invention.

FIG. 4 is a perspective view illustrating the stack electrode battery. As illustrated in FIG. 4, a positive electrode terminal 5 and a negative electrode terminal 6 are attached to the stack electrode battery 2. A bent portion 5a is formed at an end of the positive electrode terminal 5. Likewise, a bent portion 6a is formed at an end of the negative electrode terminal 6. The bent portion 5a and the bent portion 6a are bent in opposite directions to each other. The positive electrode terminal 5 is attached, by ultrasonic welding, to the positive electrode tabs of the positive electrodes that are laminated in the battery. Likewise, the negative electrode terminal 6 is attached, by ultrasonic welding, to the negative electrode tabs of the negative electrodes that are laminated in the battery.

The stack electrode battery has a width of 100 mm, a height of 110 mm, and a thickness of 12 mm.

Preparation of Battery Module

Using the stack electrode battery prepared in the above-described manner, a battery module was prepared in the following manner.

Example 1

Figure 2:
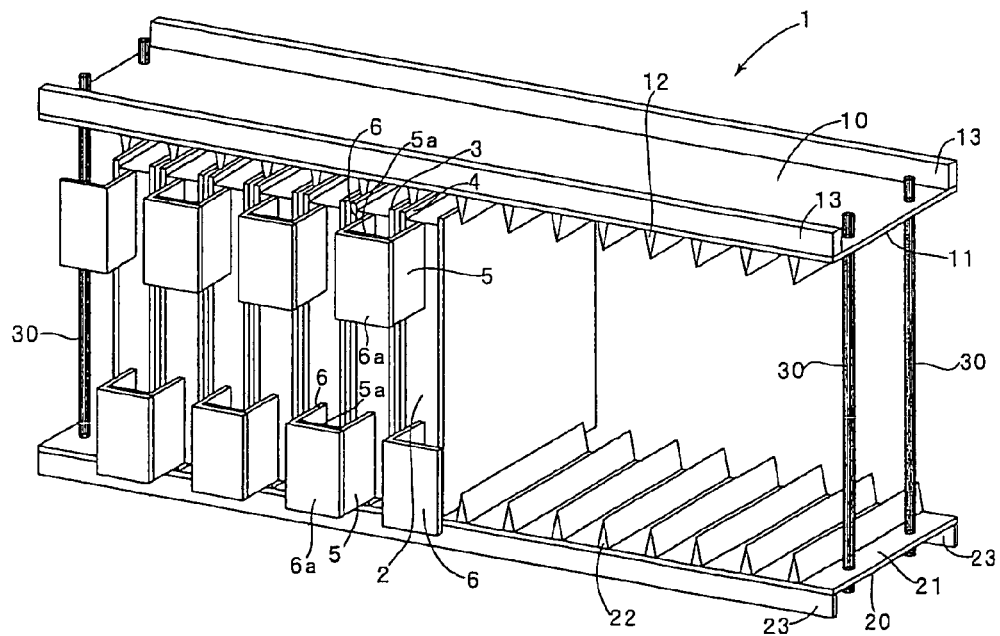
FIG. 2 is a perspective view illustrating the battery module of Example 1 according to the present invention.

FIG. 1 is a side view of the battery module prepared in Example 1, and FIG. 2 is a perspective view thereof.

As illustrated in FIGS. 1 and 2, the battery module of the present example comprises stack electrode batteries 2 stacked in a thickness direction, and two plates 3 and 4 are inserted between each of the batteries 2. Each of the plates 3 and 4 is formed of stainless steel and has a width of 100 mm, a height of 115 mm, and a thickness of 2 mm.

A pair of frame members 10 and 20 are provided so as to sandwich the batteries 2 along a direction perpendicular to the stacking direction of the batteries 2. The frame members 10 and 20 have respective opposing surfaces 11 and 21 opposed to each other, and the frame members 10 and 20 are disposed so that the opposing surfaces 11 and 21 face each other. Wedge-shaped spacers 12 and 22 are provided on the opposing surfaces 11 and 21, respectively. The wedge-shaped spacers 12 and 22 have a triangular prismatic shape. Each of the wedge-shaped spacers 12 and 22 is disposed so that its edge is inserted between the plates 3 and 4.

The width of the frame members 10 and 20 is 80 mm. The length thereof along the stacking direction of the batteries 2 is 300 mm, and the thickness thereof is 2 mm. Support portions 13 and 23 are provided at both widthwise ends of the frame members 10 and 20. The height of the support portions 13 and 23 is 8 mm, and the thickness of the frame member is 2 mm. Thus, the total height is 10 mm.

The spacers 12 and 22 have a triangular prismatic shape, as described above, and the base of the triangular prism is 4 mm and the height thereof is 10 mm. Each of the spacers 12 and 22 has an isosceles triangular cross section. The length thereof along the battery width is 80 mm. The spacers are provided in such a manner that the interval between the vertexes of the triangular prisms of the adjacent spacers is 18 mm.

The frame members 10 and 20 are formed of stainless steel. The spacers 12 and 22 are also formed of stainless steel.

As illustrated in FIG. 2, a battery 2 is electrically connected in series with an adjacent battery 2 by connecting a positive electrode terminal 5 and a negative electrode terminal 6. In the adjacent battery 2, the bent portion 5a of the positive electrode terminal 5 and the bent portion 6a of the negative electrode terminal 6 are bent in opposite directions. Thus, the bent portion 5a of the positive electrode terminal 5 is connected to the bent portion 6a of the negative electrode terminal 6 of the adjacent battery 2 so that they overlap with each other. The connecting of the positive electrode terminal 5 and the negative electrode terminal 6 may be effected by ultrasonic welding, resistance welding, screw fastening, and the like. In the case that screw-fastening is carried out, a hole through which a bolt is pierced may be formed in each of the terminals so that the terminals may be secured to each other with a bolt and a nut. Electric current of the batteries 2 connected in series is taken out from the positive electrode terminal 5 of the battery 2 that is positioned at one end and the negative electrode terminal 6 of the battery 2 that is positioned at the other end. In the present example, the stacked batteries 2 are electrically connected in series, but it is also possible to electrically connect the batteries 2 in parallel. It should be noted that in FIG. 1, the positive electrode terminals 5 and the negative electrode terminals 6 are not shown.

Figure 3:
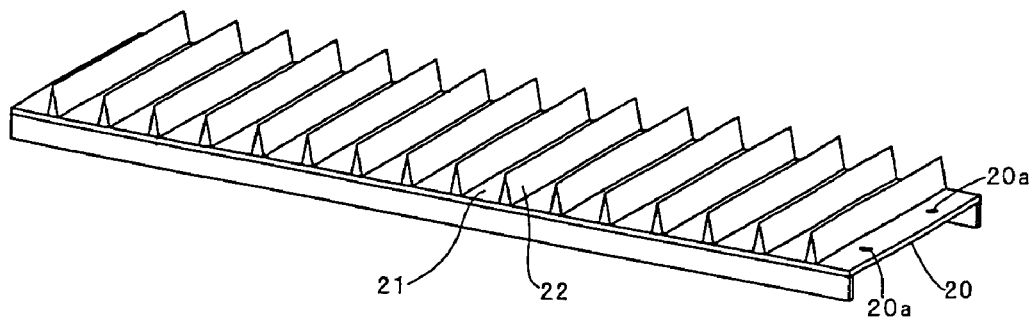
FIG. 3 is a perspective view illustrating a frame member and spacers used in the battery module of Example 1 according to the present invention.

FIG. 3 is a perspective view illustrating a frame member 20. It should be noted that a frame member 10 is also configured in the same manner. As illustrated in FIG. 3, holes 20a are formed in end portions of the frame member 20 along the battery stacking direction. Two holes are formed in each end portion, so in both end portions, four holes are formed in total. As illustrated in FIGS. 1 and 2, a connecting rod 30 is pierced through each of the holes, and as illustrated in FIG. 1, threaded fasteners 31 are attached to both ends of each connecting rod 30. By tightening the threaded fasteners 31, the distance between the frame member 10 and the frame member 20 can be narrowed. It should be noted that in FIG. 2, the threaded fasteners 31 are not shown. The connecting rod 30 has a diameter of 8 mm and a length of 133 mm. The connecting rods 30 are also made of stainless steel. By mounting the threaded fasteners 31 and narrowing the gap between the frame member 10 and the frame member 20, the wedge-shaped spacers 12 of the frame member 10 and the wedge-shaped spacers 22 of the frame member 20 are allowed to advance inwardly between the plates 3 and the plates 4. By allowing the spacers 12 and 22 to advance toward the center in this way, the two plates 3 and 4 can be shifted in directions away from each other, and by allowing the plates 3 and to shift in directions away from each other, each of the batteries 2 can be compressed between adjacent ones of the plates.

Each battery 2 is compressed by being pressed and sandwiched between the plates 3 and 4 that are shifted in the above-described manner. Almost the same compression state can be achieved in each of the batteries 2. Therefore, a uniform pressure can be applied to each of the batteries 2 in the battery module of the present example, and as a result, for example, the problem of varying compression states between the batteries positioned at end portions and the batteries positioned at the center portion, as observed in the conventional batteries, does not arise.

In addition, by allowing the spacers 12 and 22 to advance, a space is formed between the plate 3 and the plate 4, so heat can be dissipated from this space. Thus, according to the present example, the heat generated in the batteries 2 can be released efficiently. For this reason, high rate charge-discharge becomes possible. Moreover, in the present example, since the plate 3 and the plate 4 are formed of a metal, the heat generated in the batteries 2 can be transmitted and released outside efficiently. Furthermore, since the spacers 12 and 22 as well as the frame members 10 and 20 are also made of a metal, the heat from the plate 3 and the plate 4 can be transmitted and released outside efficiently.

In the present example, the spacers 12 and 22 are made in the same dimensions and shapes. However, they may have different dimensions and shapes depending on the locations at which the spacers are to be provided. By varying the dimensions and shapes of the spacers, the compression state of the batteries 2 can be varied. In addition, the space volume between the plates may be varied. Thus, it is possible to vary the dimensions and shapes of the plates so that the gap between the plates becomes wider for a location in which better heat dissipation is desired.

In addition, because the dimensions and shapes of the spacers affect the compressed state of the batteries as described above, it is also possible to adjust the compressed state to the batteries by varying the dimensions and shapes of the spacers.

In the present example, the number of the batteries 2 stacked in the battery is 15.

Comparative Example 1

Figure 5:
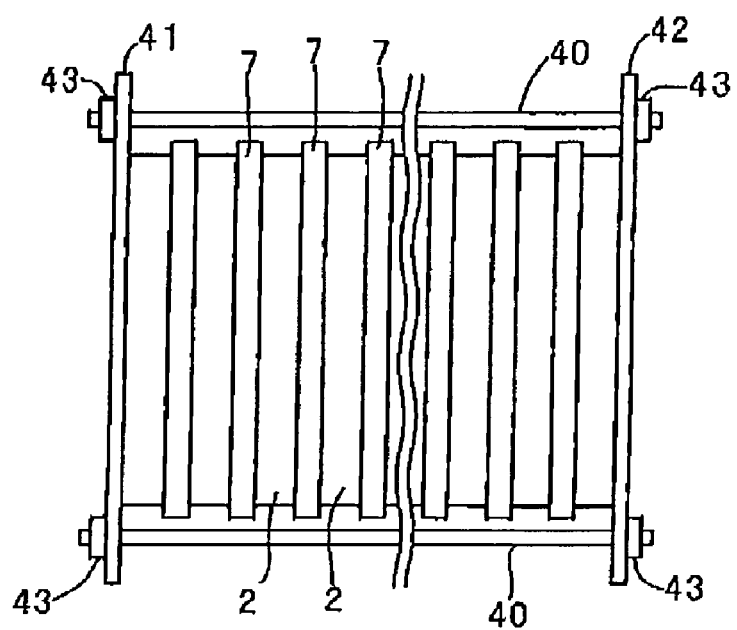
FIG. 5 is a side view illustrating a battery module of Comparative Example.

A battery module of Comparative Example, shown in FIG. 5, was prepared using the same stack electrode battery 2 described above. FIG. 5 shows a side view thereof. A plate 7 (width 100 mm, height 115 mm, thickness 5 mm) formed of a polyether ether ketone (PEEK) resin is disposed between each of the batteries 2. Compressing plates 41 and 42 (width 130 mm, height 140 mm, thickness 5 mm) formed of stainless steel are provided on both ends of the stacked batteries 2. Holes are formed at the four corners of the compressing plates 41 and 42, which are connected by four connecting rods 40 guided through the holes. By tightening threaded fasteners 43 provided on both ends of each of the connecting rods 40, the batteries 2 are compressed. The, connecting rod 40 has a diameter of 8 mm and a length of 290 mm, and it is formed of stainless steel.

In Comparative Example 1 as well, the number of the batteries 2 stacked in the battery is 15.

Evaluation of Compression State of the Batteries

In order to evaluate the state of the pressure applied to each of the batteries 2 in Example 1, a pressure sensitive paper (a pressure sensitive paper that shows a response at 0.2 MPa and shows a change in color at the area in which pressure is applied) was inserted between each of the plates 3 or 4 and each side surface of the batteries 2, and the compression state in the battery module was thus evaluated. Likewise, in order to evaluate the state of the pressure applied to each of the batteries 2 in Comparative Example 1, a pressure sensitive paper was inserted between each plate 7 and each of the batteries 2, and the compression state was evaluated.

As a result, it was observed in Comparative Example 1 that there was a large difference in the applied pressure between a stack electrode battery positioned at a central portion of the battery module and a battery positioned at a peripheral portion thereof. In contrast, it was confirmed in the battery of Example 1 that substantially the same level of pressure was applied to each of the batteries, and that each of the batteries was compressed uniformly.

Evaluation of Heat Dissipation Capability
—Evaluation for Stack Electrode Battery Heat dissipation capability of the stack electrode battery before assembled into the battery module was evaluated. First, the battery was charged at a constant current of 1 C (12 A) and thereafter charged at a constant voltage of 4.2 V. Thereafter, the battery was discharged at 1 C (12 A), and in this discharge, the discharge capacity was found to be 12 Ah. When the battery was discharged at 10 C (120 A), the discharge capacity was found to be 10.8 Ah.

Assuming a hermetically sealed condition in a battery, the battery was thermally insulated with a 20 mm thick thermal insulating material (glass wool). When discharged at 10 C, the temperature of the battery increased from 20° C. to 60° C. (at the end of discharge).

—Evaluation for the Battery Module of Example 1

The battery module of Example 1 was placed in a hermetically closed space. The battery was charged at 1 C and thereafter discharged at 10 C, to measure the temperature increase. As a result, it was found that the battery temperature increased from 20° C. to 50° C. (immediately after the discharge). The temperature variation between the batteries in the battery module was within 5° C.

As described above, the temperature increase in the battery module of Example 1 proved to be less than that of the battery in the thermally insulated condition. Even when the battery module was placed in a hermetically closed space, the battery temperature did not rise to an abnormal temperature of 70° C. Thus, it is demonstrated that according to the present invention, heat can be dissipated from each of the batteries efficiently.

The number of the batteries stacked is 15 in the foregoing example. However, the number of batteries stacked in the battery module according to the present invention is not limited by the foregoing example as long as a plurality of batteries is contained therein.

Moreover, in the foregoing example, two plates are shifted in directions away from each other by using a pair of frame members, providing wedge-shaped spacers on opposing surfaces of the frame members, and inserting the spacers between the two plates; however, the present invention is not limited to the foregoing example, and the two plates may be shifted in directions away from each other by other means.

Furthermore, the dimensions, shapes, and materials of the plates and spacers in the present invention are not limited to those described in the foregoing example, and various dimensions, shapes, and materials may be employed.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2007-147116 filed Jun. 1, 2007, which is incorporated herein by reference.

What is claimed is:

1. A method for manufacturing a battery module comprising a plurality of prismatic batteries stacked in a thickness direction, said plurality of prismatic batteries being selected from the group consisting of a plurality of prismatic lithium ion batteries, a plurality of prismatic nickel cadmium batteries and a plurality of prismatic nickel-metal hydride batteries and each prismatic battery having opposing flat central parts, comprising a process that two plates are provided between each of the prismatic batteries, and each of the prismatic batteries is compressed by shifting the two plates in directions away from each other whereby pressure is applied by the plates to said flat central parts.

2. The method for manufacturing a battery module according to claim 1, wherein each of the prismatic batteries is a lithium-ion battery having a battery case made of a laminate film.

3. The method for manufacturing a battery module according to claim 1, wherein to shift the two plates in directions away from each other and compress each of the prismatic batteries, a pair of frame members is provided, each frame member having an opposing surface extending along a stacking direction of the prismatic batteries, the opposing surfaces being disposed face to face so as to sandwich the prismatic batteries in a direction perpendicular to the stacking direction of the prismatic batteries; wedge-shaped spacers, each being inserted between the two plates, are provided on the opposing surfaces of the frame member, respectively; and by narrowing a gap between the pair of frame members, the spacers are allowed to advance inwardly between the two plates.

4. The method for manufacturing a battery module according to claim 3, wherein each of the prismatic batteries is sandwiched and held between adjacent ones of the plates.

5. The method for manufacturing a battery module according to claim 3, wherein to narrow the gap between the pair of frame members, a plurality of connecting rods, each rod having a threaded fastener provided on at least one end thereof, are provided between the pair of frame members, and the threaded fasteners are tightened.

6. The method for manufacturing a battery module according to claim 1, wherein the plates are made of metal.

* * * * *